Patented Aug. 16, 1932

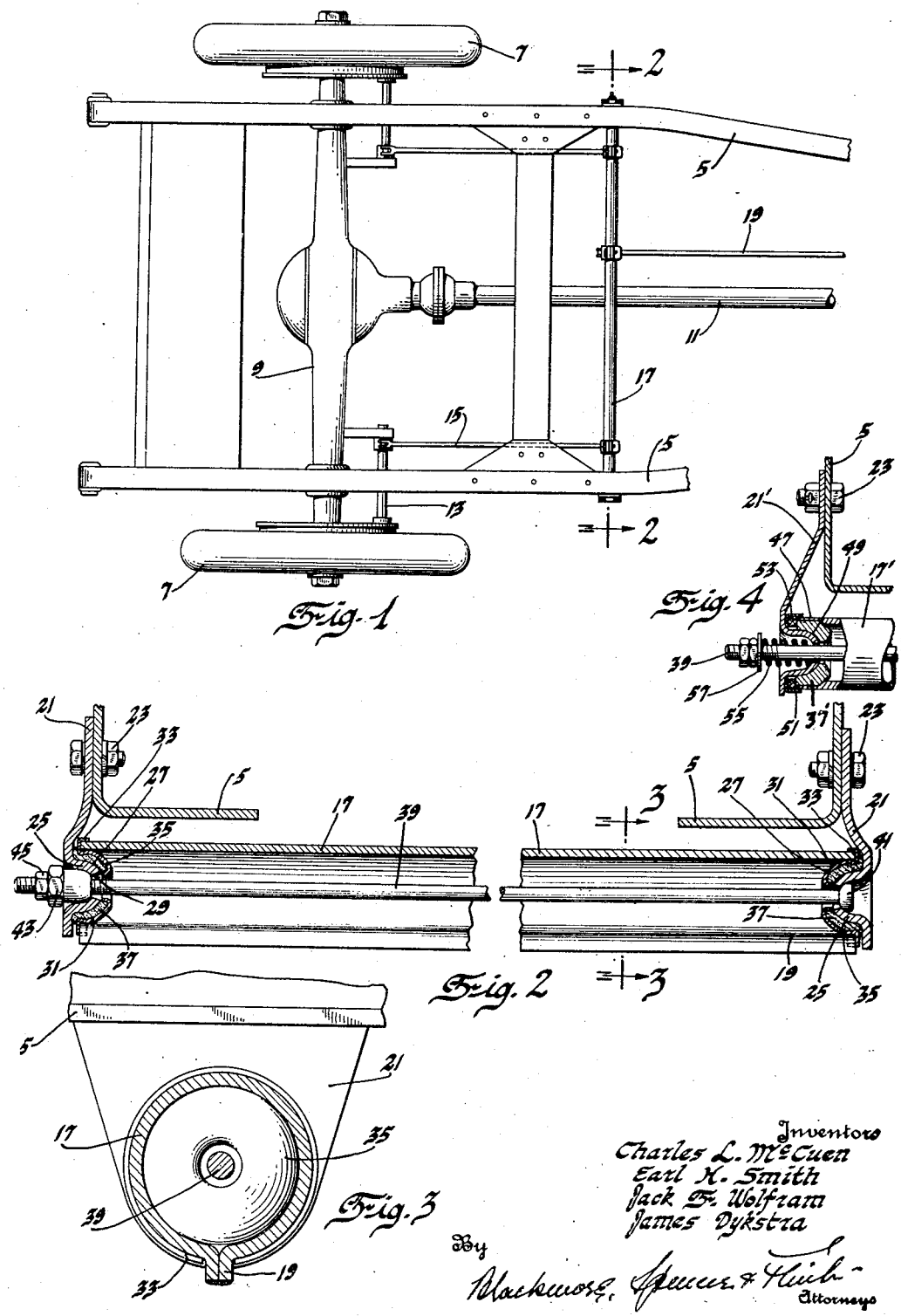

1,872,160

UNITED STATES PATENT OFFICE

CHARLES L. McCUEN, JAMES DYKSTRA, EARL H. SMITH, AND JACK F. WOLFRAM, OF LANSING, MICHIGAN, ASSIGNORS TO GENERAL MOTORS CORPORATION, OF DETROIT, MICHIGAN, A CORPORATION OF DELAWARE

BRAKE CROSS SHAFT

Application filed December 19, 1930. Serial No. 503,384.

This invention relates to brakes for vehicles and more particularly to a transversely positioned rock shaft constituting part of the brake hook-up.

One object of the invention is to provide an adequate end support for such a shaft.

A further object is to provide for longitudinal adjustment at the ends of the shaft. The invention also contemplates a construction which shall be free from noise, and which shall require no lubrication. Added strength and economy in production are also among the ends to be attained.

The invention described below is illustrated in the accompanying drawing.

In the drawing—

Fig. 1 is a plan view of a part of the vehicle chassis with our cross shaft installed.

Fig. 2 is a section on line 2—2 of Fig. 1.

Fig. 3 is a section on line 3—3 of Fig. 2.

Fig. 4 is a sectional view showing a modified form.

Referring to the drawing, numeral 5 represents the chassis frame supported at its rear ends by wheels 7 at the ends of an axle housing 9. Into this axle housing extends the propeller shaft 11. As illustrating a brake-operating hook-up there is shown a rock shaft 13 suitably journaled adjacent each wheel 7. The shafts 13 are rotated by links 15 from suitable arms on rock shaft 17, which rock shaft is to be rotated by any suitable connection 19 with an operating member not illustrated.

This invention is concerned primarily with the rock shaft 17. It is made from sheet metal rolled to form a tube, and the adjoining radial flanges 19 are to be welded as will appear from Fig. 3. Secured to the side frame members are brackets 21 held by fastening means 23. These brackets may be formed as stampings and have aligned depressed portions 25, said portions having parti-spherical surfaces as at 27. These portions are provided with apertures represented by numeral 29.

Cooperating stamped members are shown at 31 having external flanges 33 seated over the ends of the tubular shaft. These stampings also have parti-spherical surfaces 35 corresponding to the similar surfaces of the brackets and surrounding the latter. Suitable bearings 37 are positioned between the surfaces 35 and 27. These bearings are of cup shape as shown, and may be constructed of asbestos preferably with strands of copper wire incorporated therein. The asbestos should also be impregnated with graphite or be otherwise formed to render the bearing self-lubricating. The bearing 37 and the stamping 31 are apertured in alignment with the aperture 29 of the bracket.

What may be called a safety rod is represented by numeral 39. This rod has a rounded head 41 seated in the spherical portion of one of the brackets and extends through the hollow tubular shaft to the outer side of the other bracket. A nut 43 spherical in outline to conform to the surface of the bracket is threaded onto the outer end of the rod 39 and preferably held in adjustable position by a lock nut 45.

With a tubular rock shaft mounted in brackets as heretofore used, there is some danger that the tube may slip from its end support. With my design this danger is avoided by the use of the rod 39 which holds the brackets from spreading away from each other. Also, by the provision of the adjusting nut 43 should any looseness develop it is possible to correct the same and provide for free rotary movement of the rock shaft without any excessive end play.

The use of the composition bearing avoids any need of lubrication and eliminates noise.

By this simple and inexpensive construction any danger of failure of the end support is avoided, there is no noise nor need of lubrication, and by the simple turning of the nut 43 correct adjustment of the rock shaft relative to the brackets is maintained.

In the modification shown in Fig. 4 the tubular shaft 17' is bored out at its ends as at 47 to receive a self-lubricating metallic bearing 37'. The bearing is shaped to fit the spherical surface 49 of the bracket 21'. An angular retainer 51 and packing ring 53 complete the assembly. A spring 55 engages the bracket 21' within its depressed portion and at the other end the spring 55 engages a washer 57 held by adjusting nuts on the rod 39. This form of the invention renders available the well-known self-lubricating bearing. It also improves the rotary support for shaft 17' in that it provides for resilient adjustability of the end play of the rock shaft. With this arrangement there is no danger of clamping the nuts so tight as to interfere with the free rotation of the shaft, since the spring will yield as the case requires.

We claim:

1. In brake-operating mechanism, a chassis having side bars, brackets secured to said side bars, said brackets having aligned parti-spherical depressions, a tubular rock shaft, parti-spherical members carried by the ends of said tubular shaft and surrounding the depressed portions of said brackets, cup-shaped bearings between and engaging said parti-spherical members together with a rod extending through said tubular shaft, one end of said rod having a head shaped to fit a bracket depression and an adjustable nut threaded on the other end of said rod and fitting within the depressed end of said other bracket.

2. In a brake-operating mechanism, a tubular rock shaft, aligned brackets having portions depressed to enter and support the ends of said shaft, a rod extending through said tubular rock shaft, means to adjustably secure said rod to said brackets whereby said rock shaft may freely rotate without excessive end play together with resilient means associated with said adjusting means.

In testimony whereof we affix our signatures.

CHARLES L. McCUEN.
JAMES DYKSTRA.
EARL H. SMITH.
JACK F. WOLFRAM.